US010068130B2

(12) United States Patent
Jiang

(10) Patent No.: US 10,068,130 B2
(45) Date of Patent: Sep. 4, 2018

(54) METHODS AND DEVICES FOR QUERYING AND OBTAINING USER IDENTIFICATION

(71) Applicant: Tencent Technology (Shenzhen) Company Limited, Shenzhen (CN)

(72) Inventor: Dawei Jiang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 26 days.

(21) Appl. No.: 15/134,191

(22) Filed: Apr. 20, 2016

(65) Prior Publication Data

US 2016/0232402 A1 Aug. 11, 2016

Related U.S. Application Data

(63) Continuation of application No. PCT/CN2014/086673, filed on Sep. 17, 2014.

(30) Foreign Application Priority Data

Oct. 22, 2013 (CN) .......................... 2013 1 0500623

(51) Int. Cl.
*G06K 9/00* (2006.01)
*G06F 17/30* (2006.01)
*G06F 21/00* (2013.01)

(52) U.S. Cl.
CPC ......... *G06K 9/00295* (2013.01); *G06F 17/30* (2013.01); *G06F 17/30247* (2013.01); *G06F 17/30259* (2013.01); *G06F 17/30604* (2013.01); *G06F 17/30867* (2013.01); *G06F 21/00* (2013.01); *G06K 9/00255* (2013.01)

(58) Field of Classification Search
CPC .............. G06F 17/30; G06F 17/30247; G06F 17/30259; G06F 17/30604; G06F 17/30867; G06F 21/00; G06K 9/00255; G06K 9/00295
See application file for complete search history.

(56) References Cited

U.S. PATENT DOCUMENTS

| | | | | |
|---|---|---|---|---|
| 2001/0030693 | A1* | 10/2001 | Fisher | ................. H04N 1/3876 348/218.1 |
| 2013/0156274 | A1* | 6/2013 | Buchmueller | ....... G06Q 10/101 382/118 |
| 2016/0232402 | A1* | 8/2016 | Jiang | ...................... G06F 17/30 |

FOREIGN PATENT DOCUMENTS

| CN | 103220205 A | 7/2013 |
|---|---|---|
| CN | 103414815 A | 11/2013 |
| CN | 104102656 A | 10/2014 |

(Continued)

OTHER PUBLICATIONS

ISR and Written Opinion to PCT/CN2014/086673, dated Nov. 26, 2014, (14p).

*Primary Examiner* — Edward Park
(74) *Attorney, Agent, or Firm* — Brinks Gilson & Lione

(57) ABSTRACT

The present disclosure discloses a method for querying user identification which comprises steps of; receiving an uploaded target image; identifying the target image to obtain identification information of the target image; obtaining original image matching the identification information; obtaining and returning user identification corresponding to the original image. Besides, also disclosed is a device for querying user identification, as well as a method and device for obtaining user identification. The method and device for querying user identification can improve convenience of operation.

19 Claims, 9 Drawing Sheets

(56) References Cited

FOREIGN PATENT DOCUMENTS

| | | | |
|---|---|---|---|
| WO | WO2012158314 | A1 | 11/2012 |
| WO | WO2013095977 | A1 | 6/2013 |

\* cited by examiner

METHODS AND DEVICES FOR QUERYING AND OBTAINING USER IDENTIFICATION

CROSS-REFERENCE TO RELATED APPLICATIONS

This application is a continuation of PCT Application No. PCT/CN2014/086673, filed on Sep. 17, 2014, which claims priority to Chinese Patent Application No. 201310500623.0, filed on Oct. 22, 2013, both of which are hereby incorporated by reference in their entirety.

FIELD

The disclosure relates to the field of internet technology, particularly to a method and device for querying user identification, as well as a method and device for obtaining user identification.

BACKGROUND

When using existing social network applications, users need to register user identifications in social network applications to show themselves. All operations, such as adding friend, subscribing, querying user's information and sending private message, are executed on basis of the user identification.

With conventional method, in case user A wants to add user B into friend list, it is necessary that user B tells his user identification orally to user A at first. Then, user A is able to add user B into friend list according to the user identification of user B. Thereby, the conventional method cannot provide enough convenience in operation.

SUMMARY

In one aspect, the present disclosure provides a method for querying user identification, which can improve convenience in operation.

The method for querying user identification includes steps implemented by a server: receiving an uploaded target image; identifying the target image to get identification information of the target image; obtaining original image matching the identification information; and obtaining and returning user identification corresponding to the original image.

In another aspect, the present disclosure further provides a device for querying user identification, which can improve convenience in operation.

A device for querying user identification includes a hardware processor and a non-transitory storage medium configured to store at least the following modules: an image receiving module, configured to receive an uploaded target image; an image identification module, configured to identify the target image to get identification information of the target image; an image querying module, configured to get original image matching the identification information; and a user identification returning module, configured to get and return user identification corresponding to the original image.

In another aspect, the present disclosure further provides a method for obtaining user identification, which can improve convenience in operation. The method for obtaining user identification includes steps of obtaining a target image and uploading it to a server; and obtaining user identification returned by the server, in which, the user identification is corresponding to the original image obtained in the step of the server searching for original image matching the target image.

In a yet another aspect, the present disclosure further provides a device for obtaining user identification, which can improve convenience in operation. The device for obtaining user identification includes a hardware processor and a non-transitory storage medium configured to store at least the following modules: an image uploading module, configured to get a target image and upload it to a server; a user identification receiving module, configured to get user identification returned by the server, in which, the user identification is corresponding to the original image obtained in the step of the server searching for original image matching the target image.

In a still another aspect, the present disclosure further provides a method for adding friend during real-time communication, which can improve convenience in operation. The method for adding friend during real-time communication includes steps of obtaining target image through taking photo or scanning image and uploading the obtained target image to a server; obtaining target user identification returned by the server, in which the target user identification is corresponding to the original image obtained in the step of the server searching for original image matching the target image; and receiving an instruction for adding friend corresponding to the target user identification, obtaining local user identification, uploading instruction for adding friend to the server according to the local user identification and the target user identification, and, through the server, establishing friend relationship between the user account corresponding to the local user identification and the one corresponding to the target user identification.

In a still another aspect, the present disclosure further provides a device for adding friend during real-time communication, which can improve convenience in operation. The device for adding friend during real-time communication includes a hardware processor and a non-transitory storage medium configured to store at least the following modules: a target image acquiring module, configured to get target image through taking photo or scanning image and upload the obtained target image to a server; a target user identification receiving module, configured to get target user identification returned by the server, in which the target user identification is corresponding to the original image obtained in the step of the server searching for original image matching the target image; and a friend adding module, configured to receive instruction for adding friend corresponding to the target user identification, obtain local user identification, upload instruction for adding friend to the server according to the local user identification and the target user identification and, through the server, establish friend relationship between the user account corresponding to the local user identification and the one corresponding to the target user identification.

The method and device for querying user identification, the method and device for obtaining user identification and the method and device for adding friend during real-time communication are introduced above. They enable a first user to get user identification of a second user with a picture or photo containing symbolic markers of the second user when the first user wants to add the second user into his/her friend list. The second user does not need to orally inform the first user the user identification and this saves user's time and improves convenience in operation.

BRIEF DESCRIPTION OF THE DRAWINGS

Accompanying drawings used in the embodiments and prior art are briefly introduced to make further illustration on the technical scheme of embodiments of the disclosure and prior art. It is apparent that the described accompanying drawings are only specific embodiments of the disclosure. Person of skill in the art may get other accompanying drawings according to the drawings above without any creative labor.

DETAILED DESCRIPTION OF THE DRAWINGS

Figure 1:
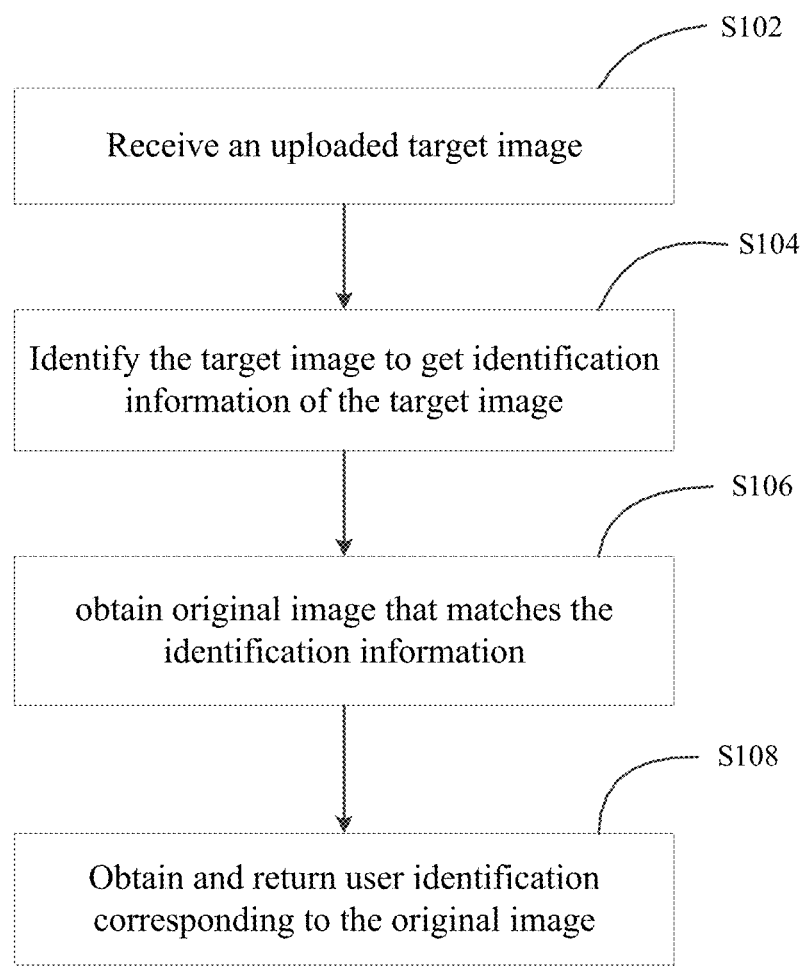
FIG. 1 shows a flow diagram of a method displaying the processing state in accordance with an embodiment.

Reference throughout this specification to "embodiments," "an embodiment," "example embodiment," or the like in the singular or plural means that one or more particular features, structures, or characteristics described in connection with an embodiment is included in at least embodiments of the present disclosure. Thus, the appearances of the phrases "in embodiments" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The communication network may include any appropriate type of communication network for providing network connections to the server and client or among multiple servers or clients. For example, communication network may include the Internet or other types of computer networks or telecommunication networks, either wired or wireless. In a certain embodiment, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client may be stationary or mobile.

A server, as used herein, may refer to one or more server computers configured to provide certain server functionalities, such as database management and search engines. A server may also include one or more processors to execute computer programs in parallel.

The solutions in the embodiments of the present disclosure are clearly and completely described in combination with the attached drawings in the embodiments of the present disclosure. Obviously, the described embodiments are only a part, but not all, of the embodiments of the present disclosure. On the basis of the embodiments of the present disclosure, all other embodiments acquired by those of ordinary skill in the art under the precondition that no creative efforts have been made shall be covered by the protective scope of the present disclosure.

In order to make the objectives, technical solutions, and advantages of the present disclosure more comprehensible, the present disclosure is further described in detail below with reference to embodiments and the accompanying drawings.

Obviously, embodiments are only described partly below, rather than all of them. Any other embodiment made by person of skill in the art without creative labor is in protection of the disclosure.

An embodiment, as shown in FIG. 1, illustrates a method for user identification query. The method can be executed only on basis of computer program, which may run in a computer system based on Von Neumann system. The method will be introduced in detail as below.

A method for querying user identification includes the steps as below.

Step S102, a server receives an uploaded target image.

In the embodiment, a user can use a terminal device to obtain target image and upload it to a server. The user may use a mobile device with camera to take photo, obtain the target image and upload the image. In other embodiments, user may take a picture locally stored in the device as target image and upload it. The server may be a server with social network application, which stores the user identification corresponding to the account registered by user in social network application.

Step S104, the server identifies the target image to obtain identification information of the target image.

In an embodiment, the step of identifying the target image to obtain identification information of the target image includes a step of extracting face region from the target image by facial recognition to obtain identification information.

Preferably, reference may be made to a reference template method, a face rule method, a sample learning method, a skin color model method and/or a characteristic sub-face method, in order to extract face region from an image. The eigenvector method and texture template method may be configured to extract identification information of face image region.

Regarding the eigenvector method, it is to determine the relative size, position, distance and other properties of facial structures first. The facial structure may include five sense organs such as eyes nose, cheekbones, and jaw. The facial structure may further include details such as iris, nostrils and lips. The server then calculates their geometrical characteristic factors, which will form the eigenvector for description of the face.

Regarding the texture template method, it is to collect all picture elements in face image information and match them with face image region using the normalized correlation measurement.

In another embodiment, cascade classifier based on Adaboost statistical study method is applied to identify face, and then nonlinear Support Vector Machine (SVM) is configured to identify face and obtain corresponding identification information. Thereby, the embodiment can position a face fast and accurately in complex background pictures assembly.

Step S106, The server obtains original image that matches the identification information.

Step S108, The server obtains and returns user identification corresponding to the original image.

In the embodiment, user can obtain the returned user identification using terminal device, in which the user identification corresponds to the original image obtained in the step of the server searching for original image matching the target image. Although the methods steps are preferably implemented by a server including a processor, a portion of the method may be implemented in a terminal device or other computing device.

The original image is picture uploaded beforehand by the user under search, corresponding to the user identification, into the server. The user under search may select several typical pictures, which can show the user's identity. The pictures as well as their corresponding web links are uploaded in form of image configuration request into a server. After the server receives the uploaded image configuration request, it will extract and store the original image and user identification corresponding to the image configuration request. Preferably, the server may identify the original image, extract identification information of the original image and store the identification information and user identification correspondingly.

In other words, the server can extract identification information representing the target image characteristics through identifying the image, then search in accordance with the identification information, and obtain the original image corresponding to the stored identification information. Thereby, the user identification corresponding to the user uploading the original image will be obtained.

Figure 2:
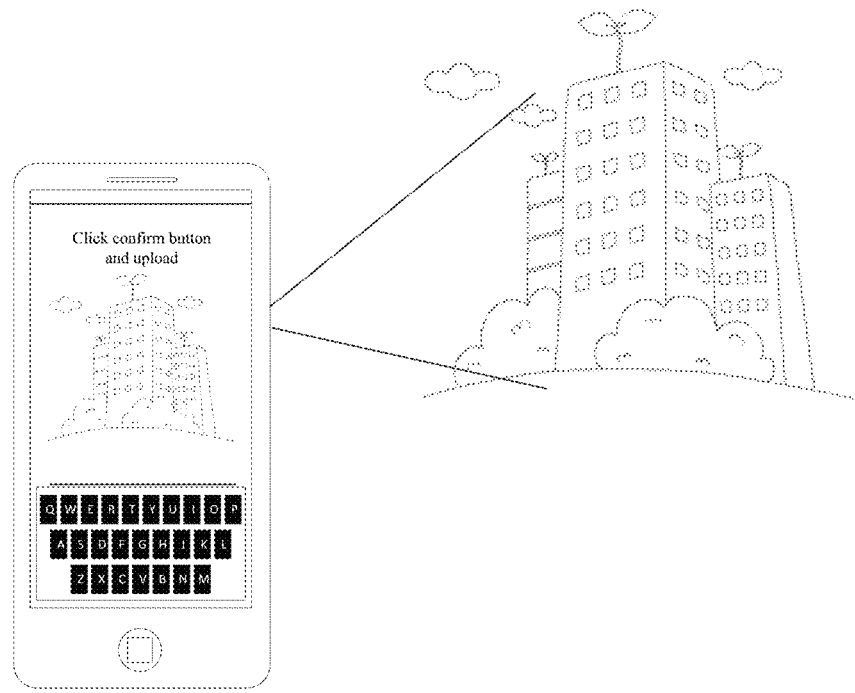
FIG. 2 shows an operation sketch map of obtaining user identification of a building through taking photo of the corresponding building in accordance with an embodiment.

For example, in an embodiment, the method is based on social network application and user identification of the user under search may be a public account of a company or public facility. Then administrator of the public account may upload beforehand to the server several landmark-building photos, trademark pictures, advertisement pictures, poster pictures and so on. In case that a user is in the company or public facility, as shown in FIG. 2, the user may use a mobile phone to photograph the landmark-building, trademark, advertisement picture or poster picture to obtain a target image and upload it into a server. Then, the server can find the uploaded original image matching the target image through identifying images. Thereby, the public account uploading the original image will be returned to the user.

Figure 3:
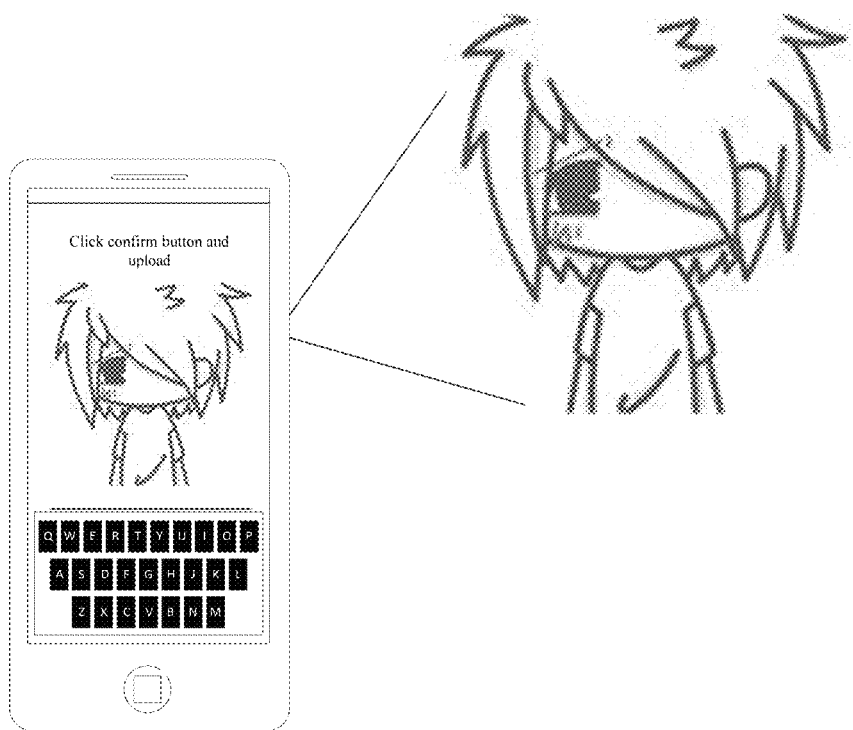
FIG. 3 shows an operation sketch map of obtaining user identification of a person through taking photo of the corresponding person in accordance with an embodiment.

For example, in an application scenario, as shown in FIG. 3, when a user is reading a movie magazine or watching a film, the user may want to subscribe to a microblog of a movie star. Then, it is available for the user to photograph the film star or picture containing the front face, and upload the photo to a server. The server will then search microblog account (user identification) corresponding to the film star according to the uploaded photo and return it to the user. Thereby, users can subscribe to the microblog of the movie star conveniently.

In another application scenario, in case that a user hopes that passerby can obtain his/her social communication account, the user may upload beforehand several his/her own front face photos and bond them with the communication account (user identification). When the user is outside and other users want to get aware of social communication account of the user but does not have an opportunity to ask the user directly, it will be available to photograph the user with a mobile phone, and then upload the user's photo.

Thereby, the user's social communication account, returned by the server, will be obtained.

In another embodiment, before a user uploads the target image to a server through a terminal device, the user may use a terminal device to execute facial recognition in the target image, extract the face region in target image and upload it to a server.

Before using a mobile phone to upload the target image, the user may process the target image beforehand. The user can extract face image region from the target image with the face rule method, and then only upload the face image region to a server. The server, as result, needs not to spend calculation resource to extract face image region from the target image. In other words, user's mobile phone can process target image beforehand, so that some of the calculation mission is removed from server and this reduces the calculation stress of server.

In an embodiment, if there are several face image regions in a target image, it will be in the preset order (left to right, top to bottom) to search for the original image matching the face image regions and return corresponding user identifications. Then, the user's mobile phone will show the user identifications in a list in accordance the order.

In other embodiments, thumbnail of a face image region may be generated, which is returned to a user together with the user identification corresponding to the face image region. Then, the mobile phone interface of the user will display several user identifications in list, and the thumbnail is shown in list item of all user identification. The user can select a proper user identification in the list according to the thumbnail. In an embodiment, the step of user obtaining video data with camera includes: obtaining video data with camera and extracting video frame from the video data to obtain target image.

Users can use camera under video mode to obtain video data. Preferably, video frame may be extracted periodically from video data as target image, and sent to server. When receiving user identification returned by the server or notification of search timeout, the uploading will be stopped.

In another embodiment, the step of receiving the target image further includes a step of obtaining uploaded video data and extracting video frame from video data to obtain target image.

In other words, user's mobile phone may not process the video data but upload the complete video data to a server. The server receives the uploaded video data and extracts video frame from the video data to obtain a target image. Preferably, the server may periodically extract video frame from the video data and identify the video frame as a target image.

Figure 4:
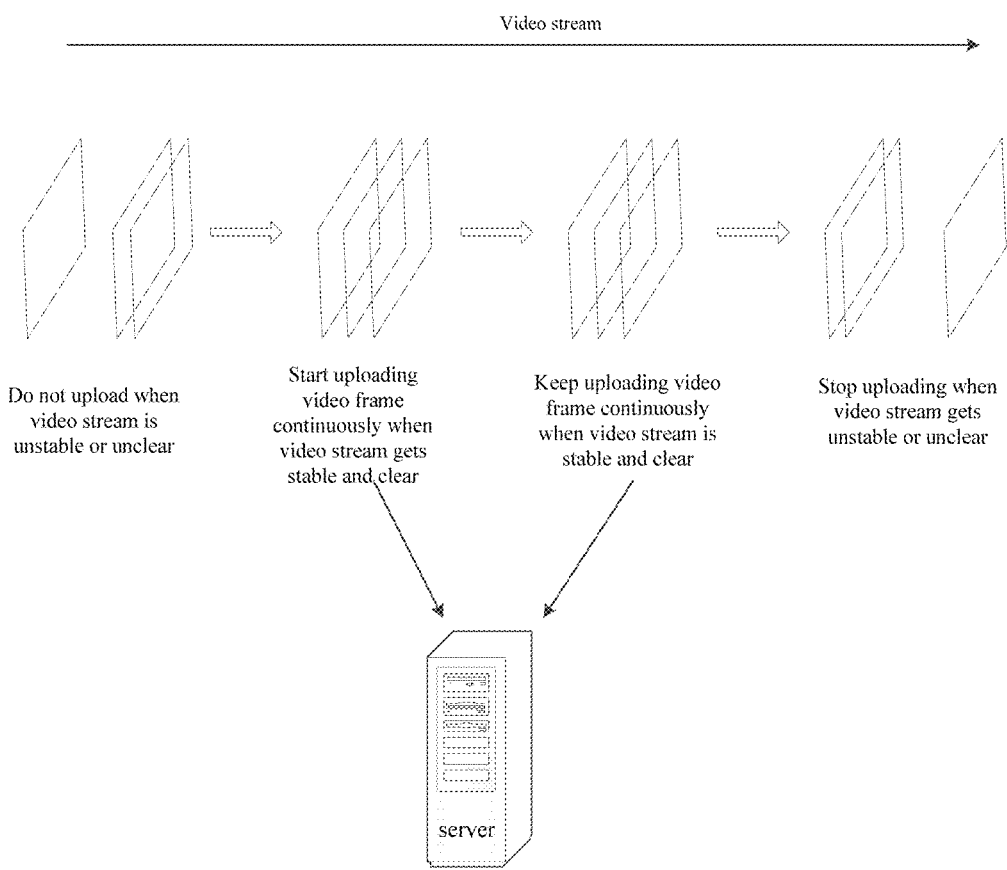
FIG. 4 shows a diagram of a method for obtaining and uploading video frame of video data in accordance with an embodiment.

For example, as shown in FIG. 4, user can obtain video stream through shooting with a mobile phone. However, due to the disadvantage in hand shaking and time for focus, some unstable (frame skipping) or unclear (improper focus) video stream may appear. Then, video frame will be periodically extracted from video stream for transmission to server after the video stream gets stable and clear. In case that during the shooting process, the video stream gets unstable and unclear again because of hands trembling or shaking, the video frame extracting process will be stopped and the frame will be uploaded. If during the continuous uploading process the server finds user identification corresponding to the video frame and returns it to mobile phone, the mobile phone will stop uploading the frame. In case of unstable or unclear video stream, or receipt of returned user identification, the process of uploading the video frame is stopped and this reduces useless data uploading and waste in flow.

In the embodiment, user can use mobile phone to photograph a certain person, photo, trademark or building continuously and upload target image continuously. Thereby, the search failure caused by unclear single photo can be avoided.

Further, the step of obtaining video data with camera includes: receiving an instruction for focusing and focusing the camera in accordance with the instruction.

In the embodiment, when photographing a face, a user may input an instruction for focusing in order to obtain clear face image. In other embodiments, focusing step may be executed automatically.

In an embodiment, before the step of returning user identification corresponding to the original image, it further includes a step of getting configuration corresponding to the user identification and determining whether it is allowed to make the user identification known to the public according to the configuration or not; if it is, returning the user identification.

In the embodiment, a user may configure the uploaded original image. A user may change the configuration on a server to set the permission of user in order to allow corresponding identification authorization through image searching. For example, a user can configure to get himself/herself being found only by male or female, or only by users in a same city, or configure a blacklist so that the users in the blacklist will be shielded in case that they upload target image and initiate search. Before returning the user identification corresponding to the original image, the server can get configuration corresponding to the user identification and determine whether it is allowed to make the user identification known to the public according to the configuration or not. If the configuration allows that, the server returns the user identification.

In an embodiment, after the step of obtaining and returning user identification corresponding to the original image, it further includes a step of receiving friend request, subscribing request, private message request or user query request corresponding to the user identification, adding the user account corresponding to the user identification into friend list, following the user account corresponding to the user identification, sending private message to user account of the user identification or returning personal information corresponding to the user identification.

Figure 5:
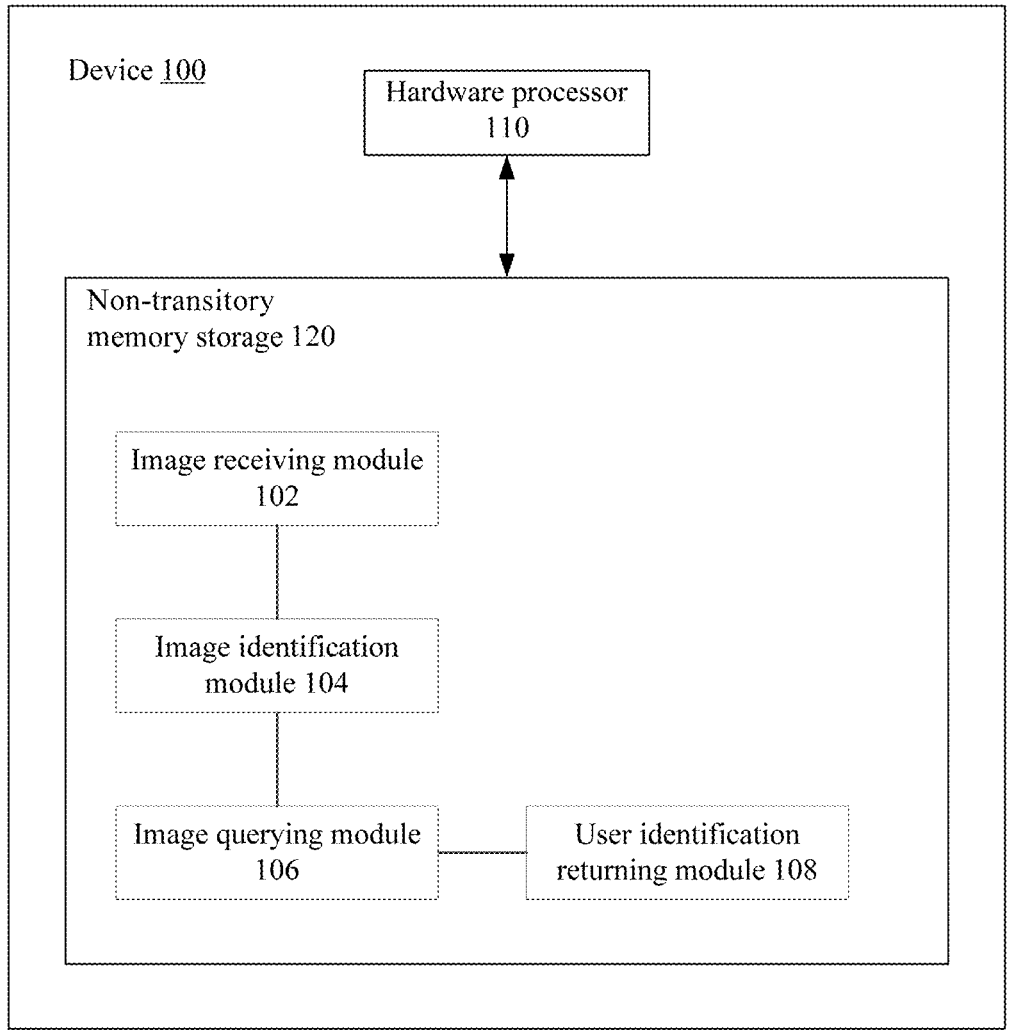
FIG. 5 shows a structural diagram of a device for querying user identification in accordance with an embodiment.

In an embodiment, as shown in FIG. 5, a device 100 for querying user identification includes a hardware processor 130 and a non-transitory storage medium 120 configured to store modules including:

an image receiving module 102, configured to receive an uploaded target image;

an image identification module 104, configured to identify the target image to obtain identification information of the target image;

an image querying module 106, configured to obtain original image matching the identification information; and a user identification returning module 108, configured to obtain and return user identification corresponding to the original image.

In an embodiment, the image identification module 104 is further configured to extract face region from the target image by facial recognition to obtain identification information.

Figure 6:
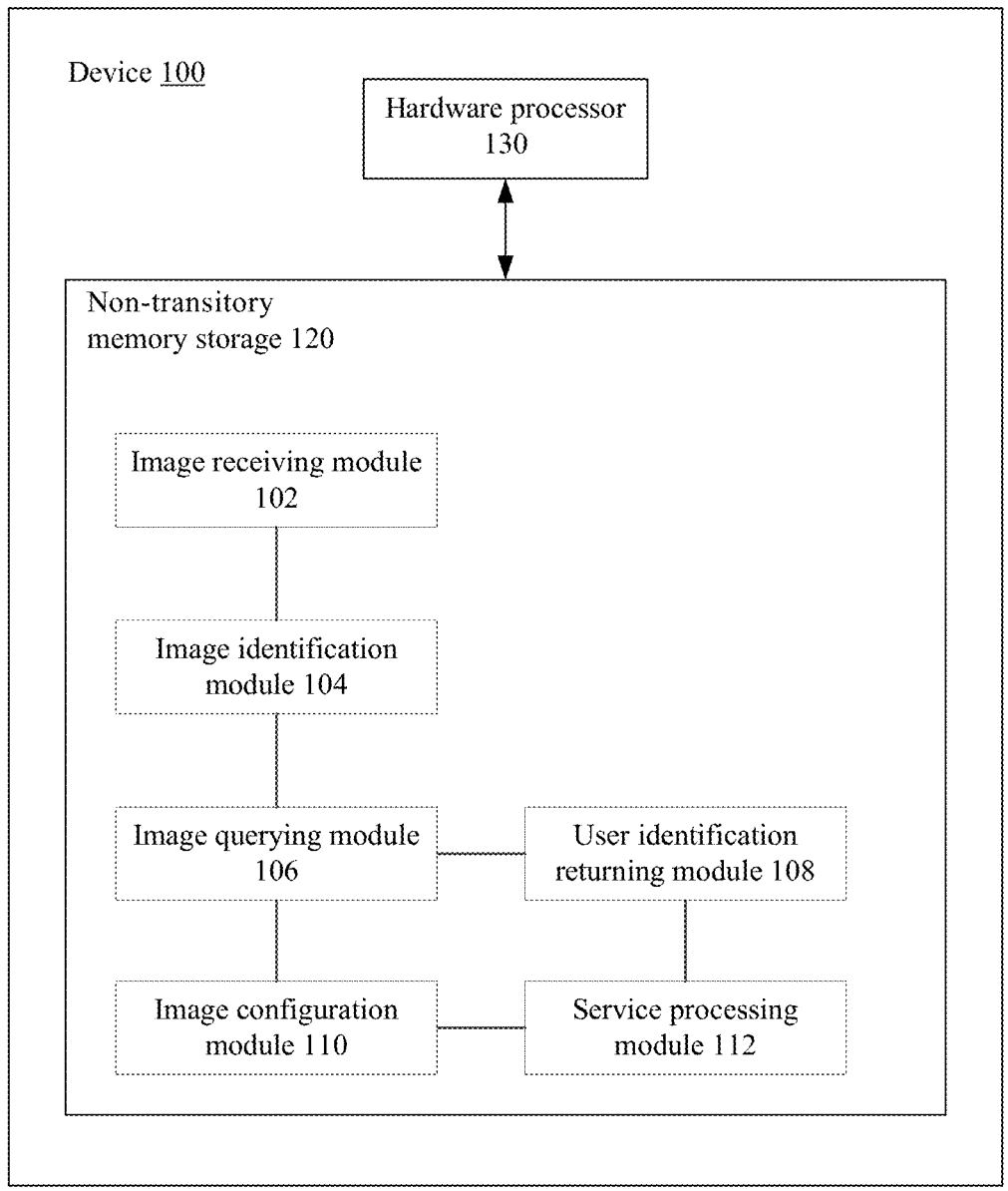
FIG. 6 shows a structural diagram of a device for querying user identification in accordance with another embodiment.

In an embodiment, as shown in FIG. 6, the device for querying user identification further includes an image configuring module 110, which is configured to receive the uploaded image configuration request, extract and store the original image and user identification corresponding to the image configuration request.

In an embodiment, the image receiving module 102 is further configured to obtain uploaded video data and extract video frame from the video data to obtain target image.

In an embodiment, the user identification returning module 108 is configured to get configuration corresponding to the user identification and determine whether it is allowed to make the user identification known to the public according to the configuration; if it is, return the user identification.

In an embodiment, as shown in FIG. 6, the device for querying user identification further includes a service processing module 112, which is configured to receive friend request, subscribing request, private message request or user query request corresponding to the user identification, add the user account corresponding to the user identification into friend list, subscribe to the user account corresponding to the user identification, send private message to user account of the user identification or return personal information corresponding to the user identification.

Figure 7:
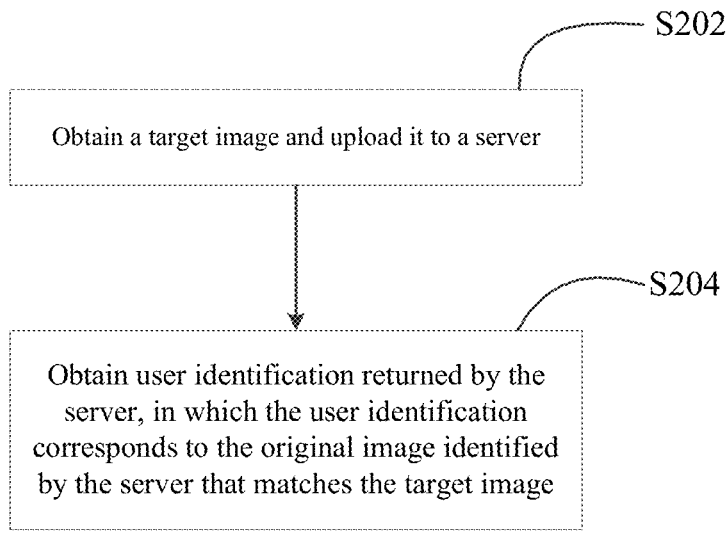
FIG. 7 shows a flow diagram of a method for obtaining user identification in accordance with an embodiment.

In embodiment, as shown in FIG. 7, a method for obtaining user identification includes steps of;

Step S202, obtaining a target image and uploading it to a server; and

Step S204, obtaining user identification returned by the server. Therein, the user identification is corresponding to the original image obtained in the step of the server searching for original image matching the target image.

In an embodiment, the step of obtaining a target image includes:

obtaining video data with camera and extracting video frame from the video data to obtain target image.

In an embodiment, the step of obtaining video data with camera includes: receiving an instruction for focusing and focusing the camera in accordance with the instruction.

In an embodiment, the step of uploading the target image to a server includes: executing facial recognition in the target image, extracting face region from the target image and uploading it to a server.

Figure 8:
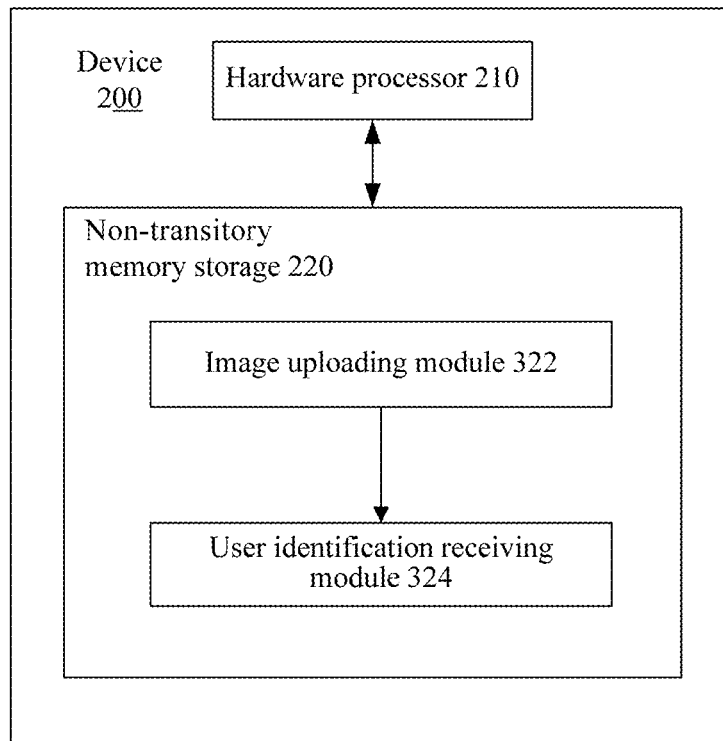
FIG. 8 shows a structural diagram of a device for obtaining user identification in accordance with an embodiment.

In an embodiment, as shown in FIG. 8, a device 200 for obtaining user identification includes a hardware processor 210 and a non-transitory storage medium 220 configured to store modules including:

an image uploading module 222, configured to obtain a target image and upload it to a server; and a user identification receiving module 224, configured to obtain user identification returned by the server. Therein, the user identification is corresponding to the original image obtained in the step of the server searching for original image matching the target image.

In an embodiment, the image uploading module 222 is further configured to obtain video data with camera and extract video frame from the video data to obtain target image.

In an embodiment, the image uploading module 222 is further configured to receive instruction for focusing and focus the camera in accordance with the instruction.

In an embodiment, the image uploading module 222 is further configured to execute facial recognition in the target image, extract face region from the target image and upload it to a server.

Figure 9:
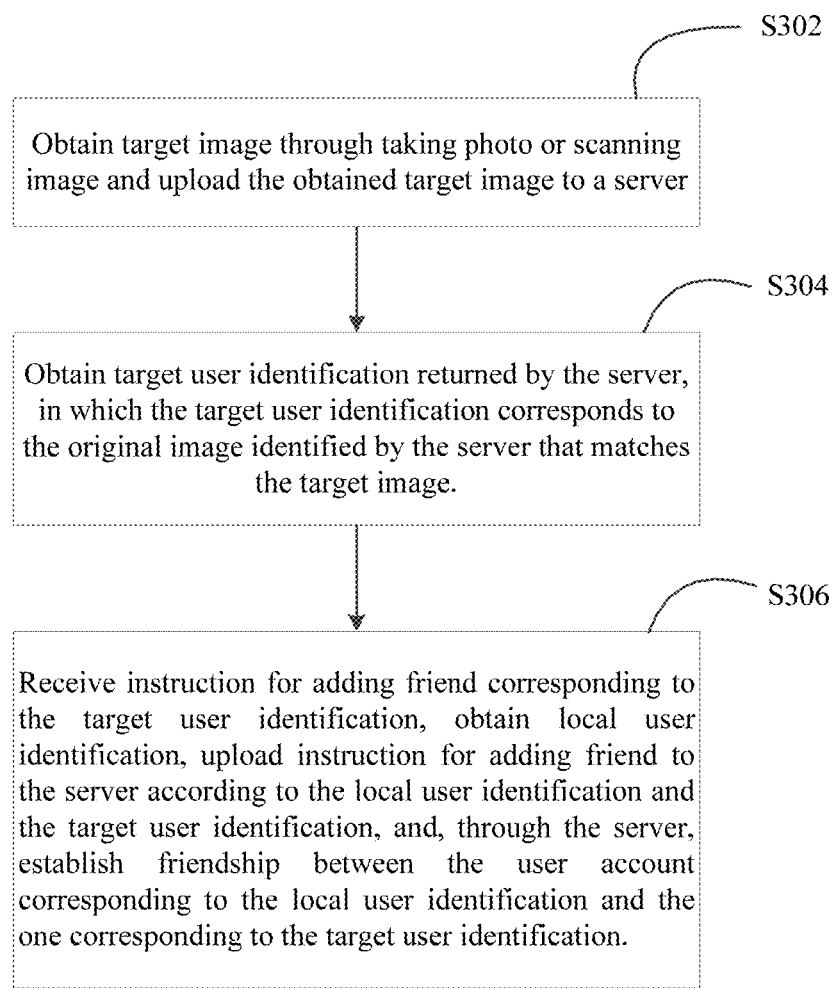
FIG. 9 shows a flow diagram of a method for adding friend during real-time communication in accordance with an embodiment.

In an embodiment, as shown in FIG. 9, a method for adding friend during real-time communication includes steps of;

Step S302, obtaining target image through taking photo or scanning image and uploading the obtained target image to a server. For example, a terminal device may obtain a target image by taking a photo of a person or an object using its camera. The terminal device may also scan an image including a person or an organization of interest. The terminal device then upload the obtained target image to a server using a communication network Step S304, obtaining target user identification returned by the server, in which the target user identification corresponds to the original image obtained in the step of the server searching for original image matching the target image. For example, the terminal device may obtain a target user identification from the server after the server identified the target user identification that corresponds to an original image that matches the person or object in the target image.

Step S306, receiving an instruction for adding friend corresponding to the target user identification, obtaining local user identification, uploading instruction for adding friend to the server according to the local user identification and the target user identification, and, through the server, establishing friend relationship between the user account corresponding to the local user identification and the one corresponding to the target user identification.

A user can photograph a target person under friend addition in real-time communication application, or photograph the photo of the target person to obtain target image.

A server then search according to the method above to obtain target user identification corresponding to the target person. The target user identification is corresponding to user account of the target person on the real-time communication application. The target user identification is corresponding to the user account of the target person in real-time communication application. The server can execute friend addition by creating their correspondence in user accounts management database of real-time communication application.

Figure 10:
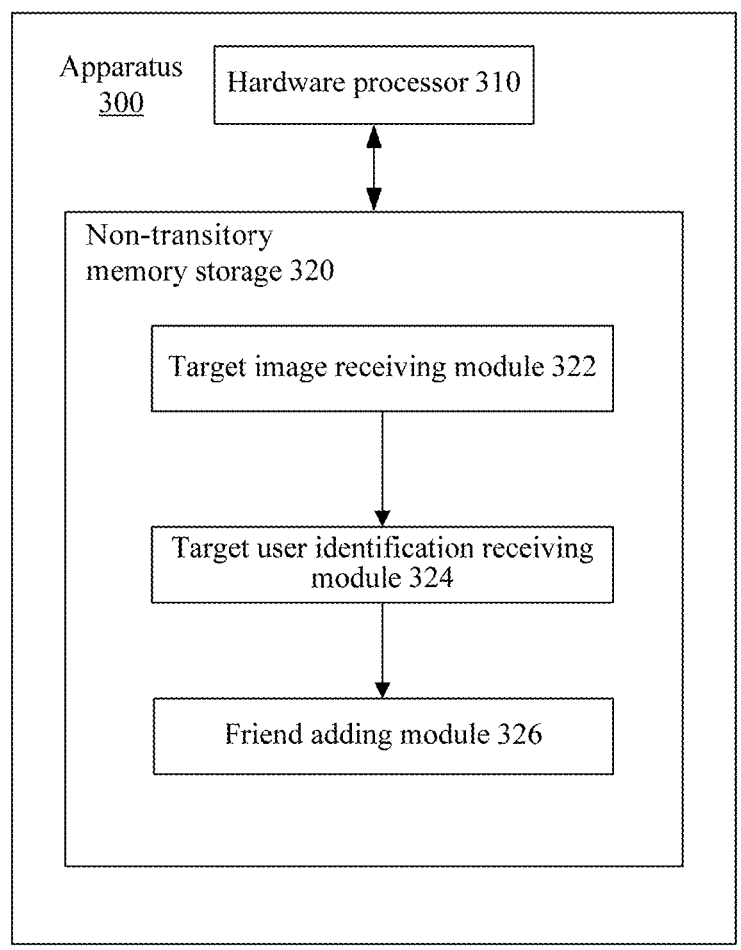
FIG. 10 shows a structural diagram of a device for adding friend during real-time communication in accordance with an embodiment.

In an embodiment, as shown in FIG. 10, a device 300 for adding friend during real-time communication includes a hardware processor 310 and a non-transitory storage medium 320 configured to store modules including:

a target image acquiring module 322, configured to obtain target image through taking photo or scanning image and upload the obtained target image to a server;

a target user identification receiving module 324, configured to obtain target user identification returned by the server. Therein, the target user identification is corresponding to the original image obtained in the step of the server searching for original image matching the target image; and friend adding module 326, configured to receive instruction for adding friend corresponding to the target user identification, obtain local user identification, upload instruction for adding friend to the server according to the local user identification and the target user identification and, through the server, establish friend relationship between the user account corresponding to the local user identification and the one corresponding to the target user identification.

Figure 11:
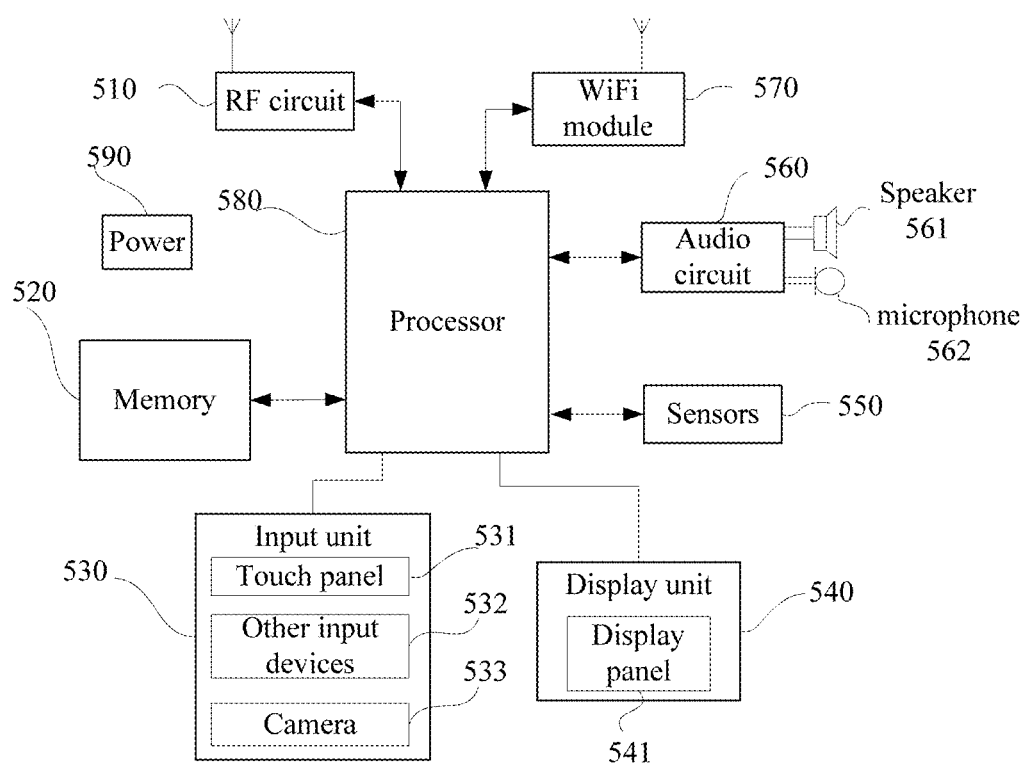
FIG. 11 shows the structural diagram of a kind of terminal device for embodiments of the disclosure.

With further reference to FIG. 11, which shows the structural diagram of an example terminal device for embodiments of the disclosure, FIG. 11 is a block diagram of a partial device related to a terminal device such as a mobile phone. For example, the terminal device includes a radio frequency (RF) circuit 510, a memory 520, an input unit 530, a display unit 540, a sensor 550, an audio circuit 560, a wireless fidelity (WiFi) module 570, a processor 580, and a power 590, etc. It's understood for persons skilled in the art that, the structure of a terminal device illustrated in FIG. 11 is not limited, some components can be added or omitted, or some combinations or arrangement can be included.

Following is a detailed description of the structure of the terminal device by combining with FIG. 11.

The RF circuit 510 is configured to receive and sending signals during calling or process of receiving and sending message. Specially, the RF circuit 510 will receive downlink information from the base station and send it to the processor 580; or send uplink data to the base station. Generally, the RF circuit 510 includes, but is not limited to, an antenna, at least one amplifier, a transceiver, a coupler, a low noise amplifier (LNA), a diplexer, and the like. In addition, the RF circuit 40 can communicate with network or other devices by wireless communication. Such wireless communication can use any one communication standard or protocol, which includes, but is not limited to, Global System of Mobile communication (GSM), (General Packet Radio Service, GPRS), (Code Division Multiple Access, CDMA), (Wideband Code Division Multiple Access, WCDMA), (Long Term Evolution, LTE), email, or (Short Messaging Service, SMS).

The memory 520 is configured to store software program and module which will be run by the processor 580, so as to perform multiple functional applications of the terminal device and data processing. The memory 530 mainly includes storing program area and storing data area. For example, the storing program area can store the operating system, at least one application program with required function (such as sound playing function, image playing function, etc.). The storing data area can store data established by terminal device according to actual using demand (such as audio data, phonebook, etc.) Furthermore, the memory 520 can be high-speed random access memory, or nonvolatile memory, such as disk storage, flash memory device, or other volatile solid-state memory devices.

The input unit 530 is configured to receive the entered number or character information, and the entered key signal related to user setting and function control of the terminal device 500. For example, the input unit 530 includes at least one of: a touch panel 531, other input devices 532, and a camera 533.

The touch panel 531 may include a touch screen, which can collect user's touch operations thereon or nearby (for example the operations generated by fingers of user or stylus pen, and the like, touching on the touch panel 531 or touching near the touch panel 531), and drive the corresponding connection device according to the preset program. Optionally, the touch panel 531 includes two portions including a touch detection device and a touch controller. Specifically, the touch detection device is configured to detect touch position of the user and detecting signals accordingly, and then sending the signals to the touch controller. Subsequently, the touch controller receives touch information from the touch detection device, and converts it to contact coordinates which are to be sent to the processor 580, and then receives command sent by the processor 580 to perform. In addition, the touch panel 531 can be implemented is forms of resistive type, capacitive type, infrared type and surface acoustic wave type. Besides the touch panel 531, the input unit 530 can include, but is not limited to other input devices 532, such as one or more selected from physical keyboard, function keys (such as volume control keys, switch key-press, etc.), a trackball, a mouse, and an operating lever, etc. The camera 533 may be an optical device configured to record images in a digital format.

The display unit 540 is configured to display information entered by the user or information supplied to the user, and menus of the terminal device. For example, the display unit 540 includes a display panel 541, such as a Liquid Crystal Display (LCD), or an Organic Light-Emitting Diode (OLED). Furthermore, the display panel 541 can be covered by the touch panel 531, after touch operations are detected on or near the touch panel 531, they will be sent to the processor 580 to determine the type of the touching event. Subsequently, the processor 580 supplies the corresponding visual output to the display panel 541 according to the type of the touching event. As shown in FIG. 11, the touch panel 531 and the display panel 541 are two individual components to implement input and output of the terminal device, but they can be integrated together to implement the input and output in some embodiments.

Furthermore, the terminal device 500 includes at least one sensor 550, such as light sensors, motion sensors, or other sensors. Specifically, the light sensors includes ambient light sensors for adjusting brightness of the display panel 541 according to the ambient light, and proximity sensors for turning off the display panel 541 and/or maintaining backlight when the terminal device is moved to the ear side. Accelerometer sensor as one of the motion sensors can detect the magnitude of accelerations in every direction (Triaxial, generally), and detect the magnitude and direction of gravity in an immobile status, which is applicable to applications of identifying attitudes of the mobile (such as switching between horizontal and vertical screens, related games, magnetometer attitude calibration, etc.), vibration recognition related functions (such as pedometer, percussion, etc.). And the terminal device 500 also can configure other sensors (such as gyroscopes, barometers, hygrometers, thermometers, infrared sensors, etc.) whose detailed descriptions are omitted here.

The audio circuit 560, the speaker 561 and the microphone 562 supply an audio interface between the user and the terminal device. Specifically, the audio data is received and converted to electrical signals by audio circuit 560, and then transmitted to the speaker 561, which are converted to sound signal to output. On the other hand, the sound signal collected by the speaker is then converted to electrical signals which will be received and converted to audio data. Subsequently, the audio data are output to the processor 580 to process, and then sent to another terminal device via the RF circuit 510, or sent to the memory 520 to process further.

WiFi pertains to short-range wireless transmission technology providing a wireless broadband Internet, by which the terminal device can help the user to receive and send email, browse web, and access streaming media, etc. Although the WiFi module 570 is illustrated in FIG. 11, it should be understood that, WiFi module 570 is not a necessary for the terminal device, which can be omitted according the actual demand without changing the essence of the present disclosure.

The processor 580 is a control center of the terminal device, which connects with every part of the terminal device by various interfaces or circuits, and performs various functions and processes data by running or performing software program/module stored in the memory 520 or calling data stored in the memory 520, so as to monitor the terminal device. Optionally, the processor 580 may include one or more processing units. Preferably, the processor 580 can integrate with application processors and modem processors, for example, the application processors include processing operating system, user interface and applications, etc.; the modem processors are used for performing wireless communication. It can be understood that, it's an option to integrate the modem processors to the processor 580.

The processor 580 is configured to control a photographic equipment such as the camera 533 to scan target picture and analyze the target picture on basis of preset graphic code processing library; on condition that matched graphic code information is obtained in the analysis, determine the target picture as graphic code and transmit the matched graphic code information obtained in the analysis; on condition that the analysis fails, photograph the target picture to obtain a photo under identification comprising the target picture, transmit the photo under identification to server and receive the information of content matched with features of the identified picture and returned by the server after identification of picture features of the target picture.

The processor 580 is configured to control the display unit 540. The display 540 is configured to display the output of the matched graphic code information obtained in the analysis or display the content information returned by the server and matched with picture features of identified picture.

Furthermore, the terminal device 500 may include a power supply (such as battery) supplying power for each component, preferably, the power supply can connect with the processor 580 by power management system, so as to manage charging, discharging and power consuming.

In addition, the terminal device 500 may include a Bluetooth module and other hardware circuits, etc., which are not illustrated.

The method and device for querying user identification, the method and device for obtaining user identification above and the method and device for adding friend during real-time communication are introduced above. They enable user A to obtain user identification of user B with a picture or photo containing symbolic markers of user B when user A wants to add user B into friend list. User B does not need to orally inform user A the user identification and this saves user's time and improves convenience in operation.

Person of skill in the art can get aware that the whole or part of method in embodiments above may be realized through relevant hardware under instruction of computer program, in which the program may be stored in a computer-readable memory medium. When the program is executed, flow processes in embodiments of method above may be contained. Therein, the memory medium above may be diskette, optical disk, Read-Only Memory (ROM) or Random Access Memory (RAM), or the like.

All disclosures above are just some of the preferred embodiments of the disclosure, which are descried specifically and particularly but not intending to limit the range of the disclosure. It should be noticed that person of skill in the art can make various changes and modifications within the scope of the disclosure, therefore, the protection scope of the present disclosure is defined by the claims.

What is claimed is:

1. A method for querying user identification, comprising:
receiving, by a server comprising a memory and a processor in communication with the memory, an image configuration request comprising an original image and a user identification corresponding to the image configuration request;
identifying, by the server, the original image according to the image configuration request;
extracting, by the server, the user identification according to the image configuration request;
storing, by the server, the original image and the extracted user identification;
receiving, by the server, a target image;
identifying, by the server, the target image to obtain identification information of the target image;
obtaining, by the server, the original image that matches the obtained identification information;
obtaining and returning, by the server, the extracted user identification corresponding to the original image; and
establishing, by the server, a friend relationship between user accounts of a local user identification and the extracted user identification.

2. The method of claim 1, wherein identifying the target image to get identification information of the target image comprises:
extracting face region from the target image by facial recognition to obtain identification information.

3. The method for querying user identification in accordance claim 1, wherein receiving the target image further comprises:
obtaining video data and extracting video frame from the video data to obtain the target image.

4. The method of claim 1, wherein before returning user identification corresponding to the original image, the method further comprises:

obtaining configuration corresponding to the user identification and determining whether it is allowed to make the user identification public according to the configuration; and
returning the user identification when the configuration allows the user identification to be public.

5. The method of claim 1, wherein after obtaining and returning user identification corresponding to the original image, the method further comprises:
receiving at least one of: a friend request, a subscribing request, a private message request, and a user query request corresponding to the user identification; and
the establishing the friend relationship between the user accounts of the local user identification and the user identification comprises performing at least one of the following:
adding a user account corresponding to the user identification into a friend list,
subscribing to the user account corresponding to the user identification,
sending private message to the user account of the user identification, and
returning personal information corresponding to the user identification.

6. The method of claim 1, wherein:
the original image comprises at least one of:
a landmark-building photo,
a trademark image,
an advertisement image, or
a poster image; and
the user identification comprises a public account of a company or public facility corresponding to the original image.

7. A device for querying user identification, comprising:
a non-transitory storage medium configured to store instructions; and
a processor in communication with the non-transitory storage medium, wherein when the processor executes the instructions, the instructions are configured to cause the processor to:
receive an image configuration request comprising an original image and a user identification corresponding to the image configuration request;
identify the original image according to the image configuration request;
extract the user identification according to the image configuration request;
store the original image and the extracted user identification;
receive a target image;
identify the target image to obtain identification information of the target image;
obtain the original image that matches the obtained identification information;
obtain and return the extracted user identification corresponding to the original image; and
establish a friend relationship between user accounts of a local user identification and the extracted user identification.

8. The device of claim 7, wherein, when the instructions are configured to cause the processor to identify the target image to obtain the identification information of the target image, the instructions are further configured to cause the processor to extract face region from the target image by facial recognition to obtain identification information.

9. The device of claim 7, wherein, when the instructions are configured to cause the processor to receive the target image, the processor are further configured to cause the processor to:
obtain video data and extract video frame from the video data to obtain the target image.

10. The device of claim 7, wherein, before the instructions are configured to obtain and return the user identification corresponding to the original image, the instructions are configured to cause the processor to:
get configuration corresponding to the user identification and determine whether it is allowed to make the user identification public according to the configuration; and
when the configuration allows the user identification to be public, returning the user identification.

11. The device of claim 7, wherein:
when the processor executes the instructions; the instructions are further configured the process to receive at least one of: a friend request, a subscribing request, a private message request, and a user query request corresponding to the user identification, and
when the instructions are configured to cause the processor to establish the friend relationship between the user accounts of the local user identification and the user identification, the instructions are configured to cause the processor to perform at least one of the following:
add a user account corresponding to the user identification into friend list,
subscribe to the user account corresponding to the user identification,
send private message to user account of the user identification, and
return personal information corresponding to the user identification.

12. A method for obtaining user identification, comprising:
obtaining, by a terminal device, a target image and uploading the target image to a server, where the server is configured to:
receive an image configuration request comprising an original image and a user identification corresponding to the image configuration request;
identify the original image according to the image configuration request;
extract the user identification according to the image configuration request;
store the original image and the extracted user identification;
receive the target image;
identify the target image to obtain identification information of the target image;
obtain the original image that matches the obtained identification information; and
obtain and return the extracted user identification corresponding to the original image; and
obtaining, by the terminal device, the extracted user identification returned by the server, wherein the user identification corresponds to the original image identified by the server that matches the target image so that the server is configured to establish a friend relationship between user accounts of a local user identification and the extracted user identification.

13. The method of claim 12, wherein the obtaining the target image comprises:
obtaining video data with camera and extracting video frame from the video data to obtain the target image.

14. The method of claim 13, wherein the obtaining the video data with the camera further comprises:
receiving an instruction for focusing; and
focusing the camera in accordance with the instruction.

15. The method of claim 12, wherein the uploading the target image to the server comprises:
executing facial recognition in the target image,
extracting a face region from the target image, and
uploading the face region to the server.

16. A device for obtaining user identification, comprising:
a non-transitory storage medium configured to store instructions; and
a processor in communication with the non-transitory storage medium, when the processor executes the instructions, the instructions are configured to cause the processor to:
obtain a target image and upload the target image to a server, where the server is configured to:
receive an image configuration request comprising an original image and a user identification corresponding to the image configuration request;
identify the original image according to the image configuration request;
extract the user identification according to the image configuration request;
store the original image and the extracted user identification;
receive the target image;
identify the target image to obtain identification information of the target image;
obtain the original image that matches the obtained identification information; and
obtain and return the extracted user identification corresponding to the original image; and
obtain the user identification returned by the server, wherein the extracted user identification corresponds to the original image identified by the server that matches the target image so that the server is configured to establish a friend relationship between user accounts of a local user identification and the extracted user identification.

17. The device of claim 16, wherein, when the instructions are configured to cause the processor to obtain the target image, the instructions are configured to cause the processor to:
obtain video data with camera and extract video frame from the video data to obtain the target image.

18. The device of claim 17, wherein, when the instructions are configured to cause the processor to obtain the video data with the camera, the instructions are further configured to cause the processor to:
receive instruction for focusing; and
focus the camera in accordance with the instruction.

19. The device of claim 16, wherein, when the instructions are configured to cause the processor to upload the target image to the server, the instructions are configured to cause the processor to:
execute a facial recognition in the target image,
extract face region from the target image, and
upload the face region to the server.

* * * * *